United States Patent
Shi et al.

(10) Patent No.: US 10,112,666 B2
(45) Date of Patent: Oct. 30, 2018

(54) PART HOLDING ASSEMBLY, AN ASSEMBLY SYSTEM AND A METHOD OF LOCATING AND SECURING A PART

(71) Applicant: GM GLOBAL TECHNOLOGY OPERATIONS LLC, Detroit, MI (US)

(72) Inventors: Jianying Shi, Oakland Township, MI (US); Scott A. McLeod, Windsor (CA); Justin Jay Hackett, Mount Clemens, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 353 days.

(21) Appl. No.: 14/830,309

(22) Filed: Aug. 19, 2015

(65) Prior Publication Data

US 2017/0050323 A1    Feb. 23, 2017

(51) Int. Cl.
  *B23P 19/10*  (2006.01)
  *B62D 65/02*  (2006.01)
  *B25J 15/00*  (2006.01)

(52) U.S. Cl.
  CPC .......... *B62D 65/022* (2013.01); *B25J 15/009* (2013.01); *B25J 15/0047* (2013.01); *B25J 15/0061* (2013.01)

(58) Field of Classification Search
  CPC ......... B23P 11/00; B23P 17/00; B23P 19/007; B23P 19/04; B23Q 1/70; B23Q 3/00; B23Q 3/04
  See application file for complete search history.

(56) References Cited

U.S. PATENT DOCUMENTS

| 4,589,184 A | 5/1986 | Asano et al. |
| 4,631,815 A | 12/1986 | Bocchicchio et al. |
| 5,066,936 A | 11/1991 | Hsu |

(Continued)

FOREIGN PATENT DOCUMENTS

| CN | 2717610 Y | 8/2005 |
| CN | 201158031 Y | 12/2008 |

(Continued)

OTHER PUBLICATIONS

Webpage entitled "Nitrogen Gas Springs" from the website: http://www.asraymond.com/nitrogen-springs.html; accessed on Jul. 29, 2015; 4 pages.
Goudsmit Magnetic Systems, brochure entitled "Magnet Grippers"; accessed Aug. 14, 2014; 4 pages.

*Primary Examiner* — Lee D Wilson
(74) *Attorney, Agent, or Firm* — Quinn IP Law

(57) ABSTRACT

An assembly system and a part holding assembly are configured to locate and secure a part defining holes. The part holding assembly further includes a first clamping device movable along a first track for positioning the first clamping device relative to the part. The first clamping device is configured to engage the part to secure the part to the first clamping device. The part holding assembly also includes a first pin device movable along a second track for positioning the first pin device relative to the location of one of the holes of the part. The first pin is configured to be disposed through the one of the holes of the part when in a closed position for locating the part. The first pin is configured to expand in the one of the holes when in an open position for securing the part to the first pin device.

19 Claims, 5 Drawing Sheets

(56) References Cited

U.S. PATENT DOCUMENTS

| | | | |
|---|---|---|---|
| 5,608,847 A * | 3/1997 | Pryor | A01B 69/008 700/248 |
| 5,816,568 A | 10/1998 | Fox | |
| 6,163,946 A * | 12/2000 | Pryor | A01B 69/008 29/407.04 |
| 6,367,788 B1 | 4/2002 | Babchuk | |
| 7,290,760 B1 | 11/2007 | Lindsay | |
| 8,025,277 B2 * | 9/2011 | Lin | B25J 15/0061 269/21 |
| 9,808,933 B2 * | 11/2017 | Lin | B25J 9/163 |
| 2008/0274865 A1 | 11/2008 | Sturm | |
| 2009/0273130 A1 | 11/2009 | Armstrong et al. | |
| 2013/0106127 A1 | 5/2013 | Lipson et al. | |
| 2013/0298382 A1 | 11/2013 | Yamashita et al. | |
| 2014/0044237 A1 | 2/2014 | Ferrer et al. | |
| 2016/0052148 A1 | 2/2016 | Shi et al. | |
| 2017/0050280 A1 | 2/2017 | Shi et al. | |
| 2017/0050323 A1 * | 2/2017 | Shi | B25J 15/0047 |

FOREIGN PATENT DOCUMENTS

| | | |
|---|---|---|
| CN | 101479437 A | 7/2009 |
| CN | 201544151 U | 8/2010 |
| CN | 102152162 A | 8/2011 |
| CN | 102267114 A | 12/2011 |
| CN | 102581632 A | 7/2012 |
| CN | 202622683 U | 12/2012 |
| CN | 203738183 U | 7/2014 |
| CN | 104668857 | 6/2015 |
| CN | 104669016 A | 6/2015 |
| DE | 219721 A1 | 3/1985 |
| DE | 102009050119 A1 | 5/2010 |
| DE | 102014202257 A1 | 8/2014 |
| EP | 2732926 A1 | 10/2013 |
| JP | 2009-90442 A | 4/2009 |
| JP | 2010201517 A | 9/2010 |

\* cited by examiner

PART HOLDING ASSEMBLY, AN ASSEMBLY SYSTEM AND A METHOD OF LOCATING AND SECURING A PART

TECHNICAL FIELD

The present disclosure relates to a part holding assembly configured to locate and secure a part defining a plurality of holes, an assembly system configured to locate and secure the part defining the holes and a method of locating and securing the part.

BACKGROUND

An assembled device comprises a multitude of structural components that are assembled to one another with sufficient precision for desired function and aesthetics. The assembled device includes multiple subassemblies each having a number of subcomponents. Typically, dedicated fixtures are designed for presenting and positioning each subcomponent relative to one or more other subcomponents to which the subcomponent is to be assembled. The dedicated fixtures are customized for a particular subcomponent and therefore have limited adjustability. These fixtures require an extended lead time and significant capital investment to design and manufacture prior to use in assembling the subcomponents. The assembled device can be a vehicle, home appliances, furniture, an aircraft, a watercraft, etc.

Generally, the holes through the various subcomponents are not standardized; therefore, separate individual dedicated grippers are utilized to move each different subcomponent. In other words, one dedicated gripper is utilized for one particular configuration of a subcomponent while another dedicated gripper is utilized for another particular configuration of another subcomponent. Therefore, specific grippers have to be designed for each particular subcomponent which requires lead time and capital investment. As such, the dedicated grippers have limited adjustability.

SUMMARY

The present disclosure provides a part holding assembly configured to locate and secure a part defining a plurality of holes. The part holding assembly includes a frame. The frame includes a first track and a second track disposed transverse to the first track. The part holding assembly further includes a first clamping device movable along the first track in a first direction and a second direction opposite the first direction for positioning the first clamping device relative to the part. The first clamping device is configured to engage the part to secure the part to the first clamping device. The part holding assembly also includes a first pin device movable along the second track in a third direction and a fourth direction opposite the third direction for positioning the first pin device relative to the location of one of the holes of the part. The first and second directions are different from the third and fourth directions. The first pin device includes a first pin movable between a closed position and an open position. The first pin is configured to be disposed through the one of the holes of the part when in the closed position for locating the part. The first pin is configured to expand in the one of the holes when in the open position for securing the part to the first pin device.

The present disclosure also provides an assembly system configured to locate and secure a part defining a plurality of holes. The system includes a support structure having an attachment member and the system includes a part holding assembly coupled to the attachment member. The part holding assembly includes the features discussed in the paragraph immediately above.

The present disclosure further provides a method of locating and securing a part. The method includes positioning a part holding assembly relative to the first part, with the part holding assembly including a frame, a first pin device including a first pin and a first clamping device including a plurality of clamping surfaces opposing each other. The method further includes moving the first pin device to position the first pin device relative to the location of a first hole of the part and inserting the first pin of the first pin device into the first hole of the part to locate the part. The method also includes clamping the part between the opposing clamping surfaces of the first clamping device to secure the part to the first clamping device and expanding the first pin after inserting the first pin into the first hole to secure the part to the first pin device.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Figure 1:
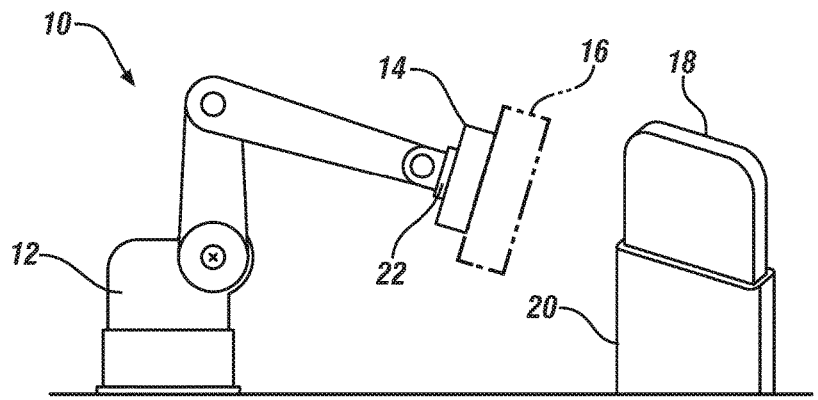
FIG. 1 is a schematic perspective view of an assembly system and a part holding assembly coupled to a support structure.

Referring to the Figures, wherein like numerals indicate like or corresponding parts throughout the several views, an assembly system 10 including a support structure 12 is generally shown in FIG. 1 with a part holding assembly 14 coupled to the support structure 12. Therefore, the assembly system 10 can include the part holding assembly 14.

Figure 2:
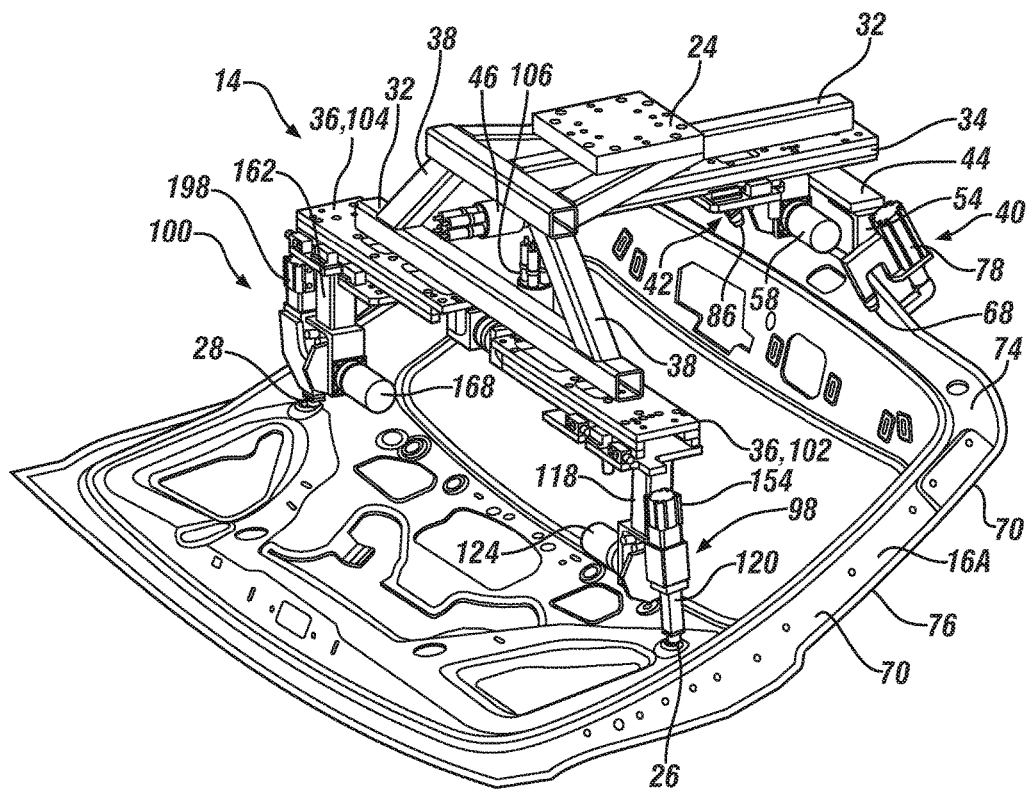
FIG. 2 is a schematic perspective view of the part holding assembly holding a part.

The part holding assembly 14 is coupleable to the support structure 12. Therefore, the part holding assembly 14 can be removed from the support structure 12 when desired. The part holding assembly 14 can be utilized to position a part 16, which is referred to as a first part 16 for the below discussion, during assembly 14. The support structure 12 can be a stationary fixture, a frame, a robotic device, etc. When the support structure 12 is the robotic device (as shown in FIG. 1), the robotic device can utilize the part holding assembly 14 to locate and move the first part 16 to a desired location/orientation, details of which are discussed further below. Therefore, a controller can be in communication with the support structure 12 to position the part holding assembly 14 in a particular position relative to the first part 16. The part holding assembly 14 and the first part 16 are shown schematically in FIG. 1 to generally indicate the orientation of the components relative to the support structure 12. The details of the part holding assembly 14 are shown in FIG. 2 which is discussed further below.

Referring to FIG. 1, the part holding assembly 14 can be utilized to position the first part 16 relative to a base part 18 during assembly 14 or position the first part 16 on the support structure 12. Therefore, the assembly system 10 can include the first part 16, the base part 18, the support structure 12 and the part holding assembly 14. For example, the robotic device can position the base part 18 and another robotic device can pick up another part, such as the first part 16, and position that first part 16 relative to the base part 18. Meaning, one robotic device with one part holding assembly 14 can act as a fixture to support the base part 18 while another robotic device with another part holding assembly 14 can position the first part 16 relative to the base part 18. Alternatively, a stationary fixture 20 can be utilized to support the base part 18 or the first part 16 and the robotic device with the part holding assembly 14 can position another part relative to the base part 18 or the first part 16. In yet another alternative, the part holding assembly 14 can be secured to the stationary fixture 20 and the base part 18 or the first part 16 can be placed on that part holding assembly 14, then the robotic device with another part holding assembly 14 can position another part relative to the base part 18 or the first part 16. Generally, the part holding assembly 14 can accurately locate and hold in place the first part 16 for manufacturing and assembly 14 operations. For example, a single part, a subassembly/assembly of parts can be accurately located and held in place to assemble, weld and/or inspect various parts during the assembly 14 process. The controller can be in communication with the support structure 12 to position the part holding assembly 14 in a particular position relative to the first part 16 and/or the base part 18. The controller can include a process and a memory as detailed below for the other controllers.

Figure 3:
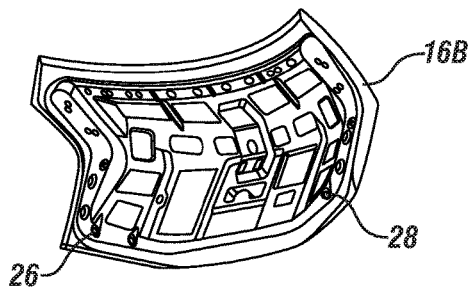
FIG. 3 is a schematic perspective view of an example of another part.

The first part 16 and the base part 18 can be any suitable configuration, and thus, are illustrated schematically in FIG. 1. Examples of different configurations of the first part 16A, 16B are shown in FIGS. 2 and 3. In certain embodiments, the first part 16 and the base part 18 can be components of a vehicle, such as body components or body panels, for cars, trucks, motorcycles, boats, aircrafts, farm equipment, etc. Alternatively, the first part 16 and the base part 18 can be for non-vehicles such as appliances, machines, farm equipment, etc. Non-limiting examples of the first part 16 are deck lids and lift gates of the vehicle. The first part 16 can be any suitable material(s), and non-limiting examples can include steel, aluminum or composites.

The part holding assembly 14 can be utilized with many different configurations of the first part 16 and the base part 18 which can provide cost and time savings, as well as provide a range of adjustability. Therefore, the part holding assembly 14 described herein provides versatility to assemble many different parts.

Continuing with FIG. 1, the support structure 12 can include an attachment member 22. Generally, the part holding assembly 14 can be coupled to the attachment member 22. The attachment member 22 can be any suitable configuration to support the part holding assembly 14. For the robotic device embodiment, movement of the attachment member 22 correspondingly moves the part holding assembly 14.

Referring to FIG. 2, the part holding assembly 14 includes a platform 24 adapted to be coupled to the support structure 12. For example, the platform 24 can be secured to the robotic device such that during movement of the robotic device the part holding assembly 14 moves accordingly. In certain embodiments, the platform 24 is secured to the attachment member 22. The platform 24 can be secured to the attachment member 22 by any suitable methods, such as for example, one or more fasteners, clips, snaps, locks, tabs, etc.

The assembly system 10, and more specifically, the part holding assembly 14, is configured to locate and secure the first part 16 defining a plurality of holes 26, 28. For example, as best shown in FIG. 3, the holes 26, 28 of the first part 16 can be defined as a first hole 26 and a second hole 28. Generally, the holes 26, 28 are spaced from each other and can be any suitable configuration. The holes 26, 28 are utilized to locate the first part 16, but the holes 26, 28 are not holes 26, 28 that a fastener, a bolt, etc. are disposed through to secure the first part 16 to another part (such as the base part 18). In other words, the holes 26, 28 are only utilized for locating the first part 16. Therefore, the controller can be programed to move the part holding assembly 14 to a particular position to locate the first part 16 via the holes 26, 28. Each of the holes 26, 28 are defined by a perimeter edge 30 of the first part 16, which will be discussed further below. It is to be appreciated that any suitable number of holes 26, 28 can be utilized.

Referring to FIG. 2, the part holding assembly 14 includes a frame 32. The platform 24 can be part of the frame 32. The frame 32 is coupleable to the attachment member 22, and more specifically, the platform 24 of the frame 32 is coupleable to the attachment member 22. The frame 32 can be removed from the attachment member 22 when desired. When the frame 32 is attached to the attachment member 22, the part holding assembly 14 moves in unison with the attachment member 22. Therefore, for the robotic device embodiment, movement of the attachment member 22 correspondingly moves the frame 32.

Continuing with FIG. 2, the frame 32 includes a first track 34 and a second track 36 disposed transverse to the first track 34. Generally, the first and second tracks 34, 36 are spaced from each other. For example, in certain embodiments, the frame 32 can include a connector 38 between the first and second tracks 34, 36 which position the first and second tracks 34, 36 offset from each other. The connector 38 can space apart the first and second tracks 34, 36, for example, spacing the first track 34 above or below the second track 36, and/or spacing the first track 34 away from the second track 36 in the same plane. Therefore, the connector 38 can offset the first and second tracks 34, 36 from each other in any suitable orientation. The connector 38 can be configured as one or more pieces.

Figure 4:
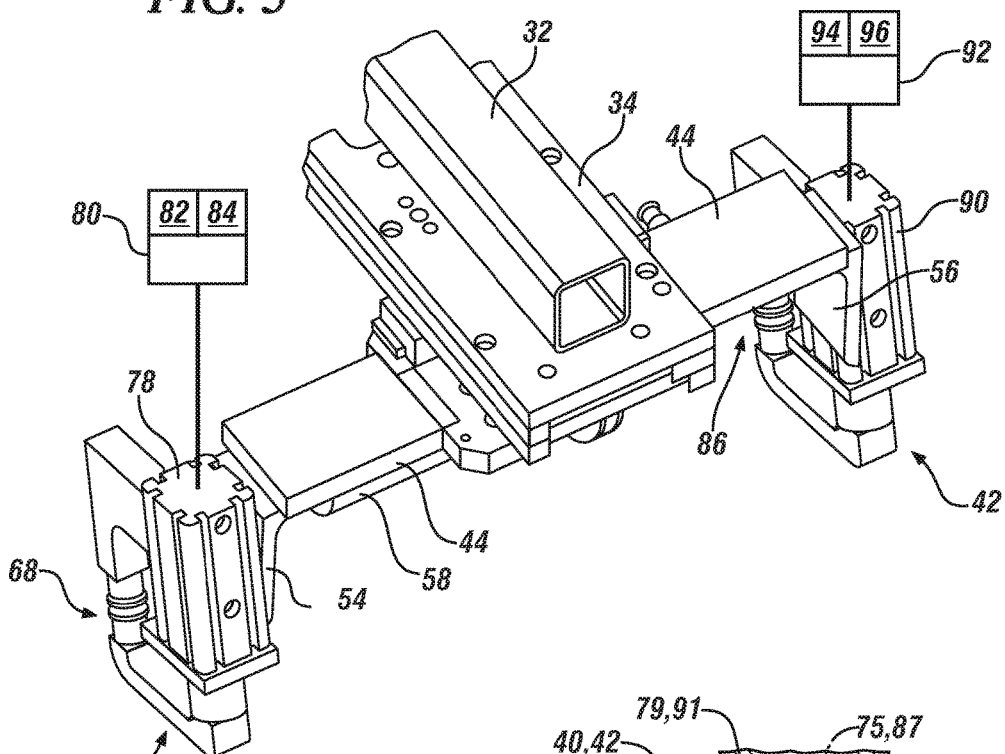
FIG. 4 is a schematic fragmentary perspective view of the part holding assembly.
Figure 5:
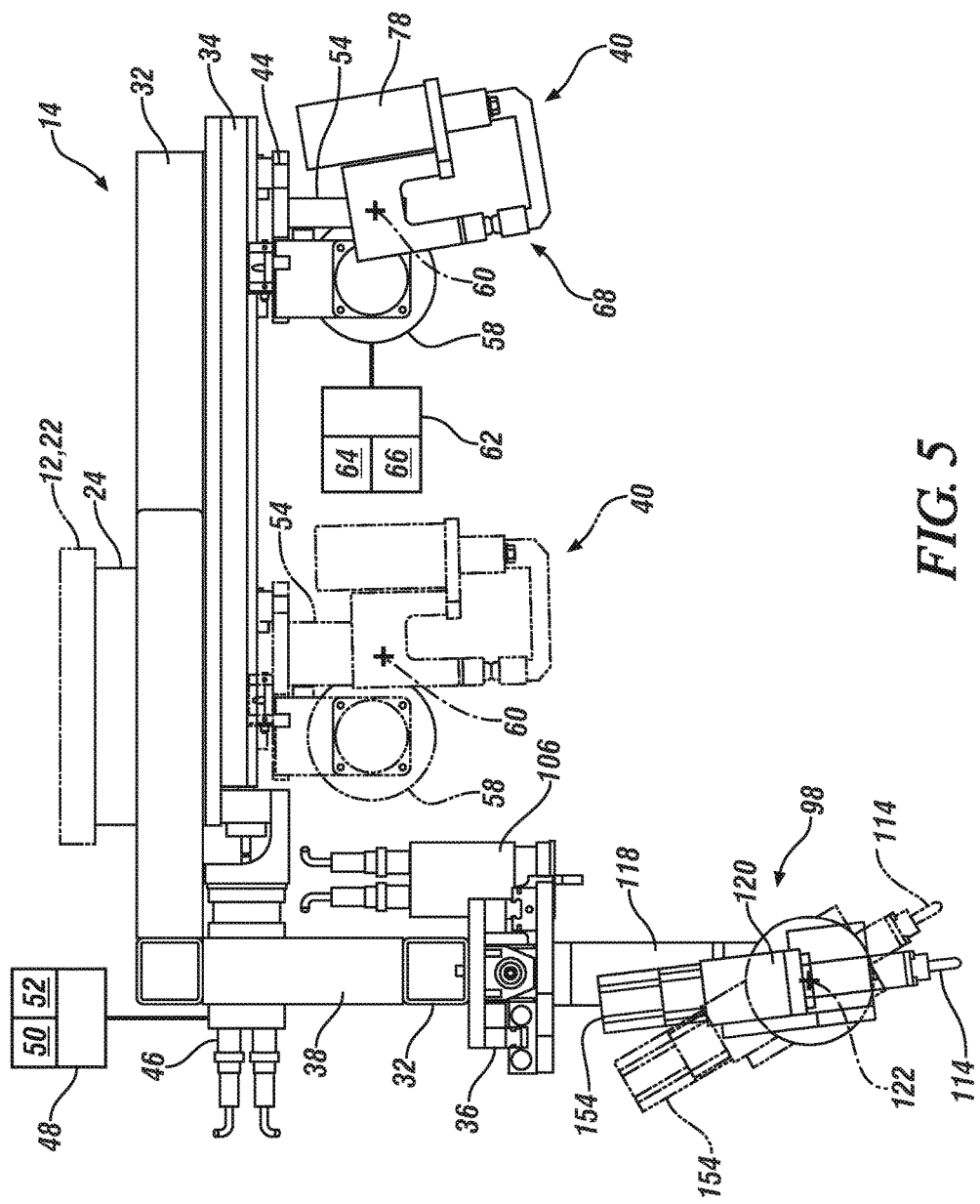
FIG. 5 is a schematic side view of a first clamping device illustrated in solid lines in one position along a first track and disposed in one position relative to a pivot point and illustrated in phantom lines in another position along the first track and disposed in another position relative to the pivot point, and also a first pin device illustrated in solid lines in one position relative to a pivot point and illustrated in phantom lines in another position relative to the pivot point.

Turning to FIGS. 2, 4 and 5, the part holding assembly 14 further includes a first clamping device 40 that is supported by the frame 32. The first clamping device 40 is movable along the first track 34 in a first direction and a second direction opposite the first direction for positioning the first clamping device 40 relative to the first part 16. The first clamping device 40 is configured to engage the first part 16 to secure the first part 16 to the first clamping device 40.

Referring to FIGS. 2 and 4, the part holding assembly 14 can further include a second clamping device 42 that is supported by the frame 32. The second clamping device 42 is spaced from the first clamping device 40 and is movable in the first and second directions. Therefore, the second clamping device 42 is movable along the first track 34. Generally, the first and second clamping devices 40, 42 can move simultaneously along the first track 34. The second clamping device 42 is configured to engage the first part 16 to secure the first part 16 to the second clamping device 42. It is to be appreciated more than two clamping devices 40, 42 can be utilized.

As best shown in FIG. 4, the part holding assembly 14 can also include a cross bar 44 movable along the first track 34 in the first and second directions. The cross bar 44 supports and spaces apart the first and second clamping devices 40, 42. Said differently, the cross bar 44 supports the first and second clamping devices 40, 42 and the first and second clamping devices 40, 42 are spaced from each other. Therefore, the cross bar 44 moves the first and second clamping devices 40, 42 simultaneously along the first track 34 in the first and second directions. The cross bar 44 can be configured as one or more pieces.

FIG. 5 illustrates one clamping device 40, 42 in solid lines to represent one position that the clamping device 40, 42 can be disposed in along the first track 34 and the same clamping device 40, 42 is also shown in phantom lines to represent another position that the clamping device 40, 42 can be disposed in along the first track 34 which is illustrative of the first and second directions that the clamping devices 40, 42 move along the first track 34. The second clamping device 42 aligns with the first clamping device 40 in FIG. 5, and therefore, FIG. 5 is illustrative of two different positions that the first and second clamping devices 40, 42 can move. Having the first and second clamping devices 40, 42 being movable provides versatility of the part holding assembly 14 to accommodate different sized first parts 16. In certain embodiments, the first and second clamping devices 40, 42 move substantially linearly between the different positions in the first and second directions.

Referring to FIGS. 2 and 5, the part holding assembly 14 can include a first actuator 46 that selectively moves the first and second clamping devices 40, 42 along the first track 34. The first actuator 46 can be attached to the frame 32 or the cross bar 44, or be in any suitable location. Regardless of the location of the first actuator 46, when the first actuator 46 is actuated, the cross bar 44 moves which correspondingly moves the first and second clamping devices 40, 42 along the first track 34. Therefore, the cross bar 44 and the first and second clamping devices 40, 42 move simultaneously along the first track 34. The first actuator 46 can be a pneumatic actuator, a hydraulic actuator, or any other suitable actuator.

Continuing with FIG. 5, the first actuator 46 can be in communication with a first controller 48. The first controller 48 can control the first actuator 46 to selectively change the position of the first and second clamping devices 40, 42 relative to the frame 32. Specifically, the first controller 48 determines the position that the first and second clamping devices 40, 42 are to be located along the first track 34, and signals the first actuator 46 to actuate which moves the first and second clamping devices 40, 42 along the first track 34. The first controller 48 can be part of an electronic control module. The first controller 48 can control other components not specifically discussed herein and/or be in electrical communication with one or more other controllers.

The first controller 48 can include a processor 50 and a memory 52 on which is recorded instructions for controlling the first actuator 46. The first controller 48 is configured to execute the instructions from the memory 52, via the processor 50. For example, the first controller 48 can be a host machine or distributed system, e.g., a computer such as a digital computer or microcomputer, and/or as a proportional-integral-derivative (PID) controller device having the processor 50, and, as the memory 52, tangible, non-transitory computer-readable memory such as read-only memory (ROM) or flash memory. The first controller 48 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the first controller 48 can include all software, hardware, memory 52, algorithms, connections, sensors, etc., necessary to control the first actuator 46. As such, a control method operative to control the first actuator 46 can be embodied as software or firmware associated with the first controller 48. It is to be appreciated that the first controller 48 can also include any device capable of analyzing data from various sensors, comparing data, making the necessary decisions required to control and monitor the first actuator 46.

Referring to FIG. 4, the cross bar 44 can include a first flange 54 having the first clamping device 40 rotatably attached to the first flange 54 for adjusting a position of the first clamping device 40 relative to the first part 16. The cross bar 44 can also include a second flange 56 having the second clamping device 42 rotatably attached to the second flange 56 for adjusting a position of the second clamping device 42 relative to the first part 16.

Referring to FIGS. 2 and 5, the part holding assembly 14 can include a second actuator 58 that selectively rotates the first and second clamping devices 40, 42 about a pivot point 60. The first and second clamping devices 40, 42 can be rotatable relative to the frame 32, and more specifically relative to the cross bar 44. In certain embodiments, the first and second clamping devices 40, 42 rotate relative to the first and second flanges 54, 56 respectively. The second actuator 58 can be attached to the cross bar 44 or be in any suitable location. Regardless of the location of the second actuator 58, when the second actuator 58 is actuated, the first and second clamping devices 40, 42 can rotate simultaneously relative to the cross bar 44. The second actuator 58 can be a pneumatic actuator, a hydraulic actuator, or any other suitable actuator.

Continuing with FIG. 5, the second actuator 58 can be in communication with a second controller 62. The second controller 62 can control the second actuator 58 to selectively rotate the first and second clamping devices 40, 42 relative to the frame 32. Specifically, the second controller 62 determines the position that the first and second clamping devices 40, 42 are to be rotated to relative to the frame 32, and signals the second actuator 58 to actuate which rotates the first and second clamping devices 40, 42. The second controller 62 can be part of an electronic control module.

The second controller 62 can control other components not specifically discussed herein and/or be in electrical communication with one or more of the first controller 48 or another controller. In certain embodiments, the second actuator 58 can be in communication with the first controller 48 such that the first controller 48 controls both the first and second actuators 46, 58, and therefore, the second controller 62 can be eliminated.

The second controller 62 can include a processor 64 and a memory 66 on which is recorded instructions for controlling the second actuator 58. The second controller 62 is configured to execute the instructions from the memory 66, via the processor 64. For example, the second controller 62 can be a host machine or distributed system, e.g., a computer such as a digital computer or microcomputer, and/or as a proportional-integral-derivative (PID) controller device having the processor 64, and, as the memory 66, tangible, non-transitory computer-readable memory such as read-only memory (ROM) or flash memory. The second controller 62 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the second controller 62 can include all software, hardware, memory 66, algorithms, connections, sensors, etc., necessary to control the second actuator 58. As such, a control method operative to control the second actuator 58 can be embodied as software or firmware associated with the second controller 62. It is to be appreciated that the second controller 62 can also include any device capable of analyzing data from various sensors, comparing data, making the necessary decisions required to control and monitor the second actuator 58.

Figure 6:
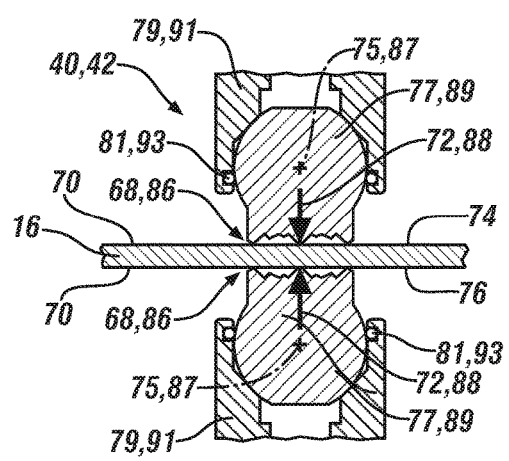
FIG. 6 is a schematic fragmentary cross-sectional view of clamping surfaces engaging the part.

Referring to FIGS. 4 and 6, the first clamping device 40 can include a plurality of clamping surfaces 68 facing each other. The first clamping device 40 clamps the first part 16 between the clamping surfaces 68. Therefore, the clamping surfaces 68 of the first clamping device 40 engage opposing sides 70 of the first part 16. The clamping surfaces 68 can be configured as teeth. In certain embodiments, the teeth of the clamping surfaces 68 can be irregular in configuration. One or more of the teeth of the clamping surfaces 68 can be in the same configuration or different configuration from each other. It is to be appreciated that the clamping surfaces 68 can be any suitable configuration.

In certain embodiments, the clamping surfaces 68 of the first clamping device 40 can engage the respective sides 70 of the first part 16 to apply a force 72 (identified as arrows 72 in FIG. 6) to the respective clamping sides 70 of the first part 16. Specifically, one of the clamping surfaces 68 apply the force 72 to a first surface 74 of one of the sides 70 of the first part 16, and the other one of the clamping surfaces 68 apply the force 72 to a second surface 76 of another one of the sides 70 of the first part 16. The second surface 76 opposes the first surface 74. The clamping surfaces 68 of the first clamping device 40 apply the force 72 to hold the first part 16 between the clamping surfaces 68. Therefore, the magnitude of the force 72 is sufficient to secure the first part 16 relative to the first clamping device 40 so that the first part 16 can be moved, for example, by the robotic device, relative to another part or relative to the stationary fixture 20.

Generally, the force 72 can be applied substantially perpendicular to the sides 70 of the first part 16. More specifically, the force 72 can be applied substantially perpendicular to the first and second surfaces 74, 76 of the first part 16. The force 72 can be applied to the first part 16 in other locations than what is illustrated in FIG. 6. Specifically, the force 72 can be applied in every location where the teeth of the clamping surfaces 68 engage the first part 16, and the arrows illustrating the force 72 in FIG. 6 is for illustrative purposes only.

The clamping surfaces 68 can be rotatable about respective pivot points 75 to accommodate different configurations and/or different orientations of the first parts 16. Simply stated, the clamping surfaces 68 can float to accommodate different configurations/orientations of the first parts 16. The clamping surfaces 68 can rotate in any direction about the respective pivot points 75. The direction that the clamping surfaces 68 rotate depends on the configuration and/or orientation of the first part 16. In certain embodiments, the clamping surfaces 68 can rotate about +/−20.0 degrees relative to the respective pivot points 75 in any direction. The clamping surfaces 68 can rotate in the same or different directions relative to each other.

The first clamping device 40 can include a plurality of first heads 77 that are rotatable about respective pivot points 75. One of the first heads 77 supports one of the clamping surfaces 68 and another one of the first heads 77 supports another one of the clamping surfaces 68. Therefore, when the first heads 77 rotate, the clamping surfaces 68 correspondingly rotates to accommodate a particular configuration and/or particular orientation of the first part 16. For example, the first heads 77 can each be partially spherical in configuration.

The first clamping device 40 can also include a plurality of first casings 79 that support respective first heads 77. The first casings 79 are configured to allow the first heads 77 to rotate about respective pivot points 75. In certain embodiments, the first casings 79 are at least partially configured to complement the partial spherical configuration of the respective first heads 77. Optionally, the first clamping device 40 can further include a plurality of first bearings or rollers 81 that engage the respective first heads 77 to minimize frictional engagement as the first heads 77 rotate about the respective pivot points 75.

At least one of the clamping surfaces 68 of the first clamping device 40 is movable to selectively clamp the first part 16. In other words, at least one of the clamping surfaces 68 of the first clamping device 40 is movable away from and toward the other one of the clamping surfaces 68 to selectively clamp the first part 16 therebetween. Therefore, the clamping surface(s) 68 of the first clamping device 40 can move away from each other to release the first part 16 or create a space to insert the first part 16 between the clamping surfaces 68. Furthermore, the clamping surface(s) 68 of the first clamping device 40 can move toward each other to secure the first part 16 relative to the first clamping device 40. In certain embodiments, both of the clamping surfaces 68 of the first clamping device 40 are movable toward/away from each other. In other embodiments, one of the clamping surfaces 68 of the first clamping device 40 is movable toward/away from the other one of the clamping surfaces 68 while the other one of the clamping surfaces 68 of the first clamping device 40 is stationary. For illustrative purposes only, FIG. 5 illustrates one of the clamping surfaces 68 of the first clamping device 40 being movable toward/away from the other one of the clamping surfaces 68.

Referring to FIG. 4, the first clamping device 40 can include a third actuator 78 that selectively moves at least one of the clamping surface(s) 68 of the first clamping device 40 toward or away from the other one of the clamping surfaces 68. The third actuator 78 can be rotatable with the first clamping device 40 relative to the frame 32/cross bar 44 or be in any suitable location. Regardless of the location of the third actuator 78, when the third actuator 78 is actuated, one or both of the clamping surfaces 68 move toward or away from each other. When the third actuator 78 is actuated to clamp the first part 16, the force 72 applied to the first part 16 is sufficient to hold the first part 16 between the clamping surfaces 68. The third actuator 78 can be a pneumatic actuator, a hydraulic actuator, or any other suitable actuator.

Continuing with FIG. 4, the third actuator 78 can be in communication with a third controller 80. The third controller 80 can control the third actuator 78 to selectively move the clamping surface(s) 68 of the first clamping device 40 which selectively secures the first part 16 to the first clamping device 40. Specifically, the third controller 80 determines the position that the clamping surface(s) 68 of the first clamping device 40 are to be in relative to each other, and signals the third actuator 78 to actuate which moves the clamping surface(s) 68 accordingly. The third controller 80 can be part of an electronic control module.

The third controller 80 can control other components not specifically discussed herein and/or be in electrical communication with one or more of the first and second controllers 48, 62 or another controller. In certain embodiments, the third actuator 78 can be in communication with the first controller 48 such that the first controller 48 controls the first, second and third actuators 46, 58, 78, and therefore, the third controller 80 can be eliminated. When utilizing the second controller 62, the third actuator 78 can be in communication with the first controller 48 or the second controller 62 such that either the first controller 48 controls the third actuator 78 or the second controller 62 controls the third actuator 78, and therefore, the third controller 80 can be eliminated.

The third controller 80 can include a processor 82 and a memory 84 on which is recorded instructions for controlling the third actuator 78. The third controller 80 is configured to execute the instructions from the memory 84, via the processor 82. For example, the third controller 80 can be a host machine or distributed system, e.g., a computer such as a digital computer or microcomputer, and/or as a proportional-integral-derivative (PID) controller device having the processor 82, and, as the memory 84, tangible, non-transitory computer-readable memory such as read-only memory (ROM) or flash memory. The third controller 80 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the third controller 80 can include all software, hardware, memory 84, algorithms, connections, sensors, etc., necessary to control the third actuator 78. As such, a control method operative to control the third actuator 78 can be embodied as software or firmware associated with the third controller 80. It is to be appreciated that the third controller 80 can also include any device capable of analyzing data from various sensors, comparing data, making the necessary decisions required to control and monitor the third actuator 78.

Turning to FIGS. 4 and 6, the second clamping device 42 includes a plurality of clamping surfaces 86 facing each other. The second clamping device 42 clamps the first part 16 between the clamping surfaces 86. Therefore, the clamping surfaces 86 of the second clamping device 42 engage the opposing sides 70 of the first part 16. The clamping surfaces 86 can be configured as teeth. In certain embodiments, the teeth of the clamping surfaces 86 can be irregular in configuration. One or more of the teeth of the clamping surfaces 86 can be in the same configuration or different configuration from each other. It is to be appreciated that the clamping surfaces 86 can be any suitable configuration.

In certain embodiments, the clamping surfaces 86 of the second clamping device 42 can engage the respective sides 70 of the first part 16 to apply a force 88 (identified as arrows 88 in FIG. 6) to the respective sides 70 of the first part 16. Specifically, one of the clamping surfaces 86 apply the force 88 to the first surface 74 of one of the sides 70 of the first part 16, and the other one of the clamping surfaces 86 apply the force 88 to the second surface 76 of another one of the sides 70 of the first part 16. The clamping surfaces 86 of the second clamping device 42 apply the force 88 to hold the first part 16 between the clamping surfaces 86. Therefore, the magnitude of the force 88 is sufficient to secure the first part 16 relative to the second clamping device 42 so that the first part 16 can be moved, for example, by the robotic device, relative to another part or relative to the stationary fixture 20.

Generally, the force 88 can be applied substantially perpendicular to the sides 70 of the first part 16. More specifically, the force 88 can be applied substantially perpendicular to the first and second surfaces 74, 76 of the first part 16. The force 88 can be applied to the first part 16 in other locations than what is illustrated in FIG. 6. Specifically, the force 88 can be applied in every location where the teeth of the clamping surfaces 86 engage the first part 16, and the arrows illustrating the force 88 in FIG. 6 is for illustrative purposes only.

The clamping surfaces 86 can be rotatable about respective pivot points 87 to accommodate different configurations and/or different orientations of the first parts 16. Simply stated, the clamping surfaces 86 can float to accommodate different configurations/orientations of the first parts 16. The clamping surfaces 86 can rotate in any direction about the respective pivot points 87. The direction that the clamping surfaces 86 rotate depends on the configuration and/or orientation of the first part 16. In certain embodiments, the clamping surfaces 86 can rotate about +/−20.0 degrees relative to the respective pivot points 87 in any direction. The clamping surfaces 86 can rotate in the same or different directions relative to each other.

The second clamping device 42 can include a plurality of second heads 89 that are rotatable about respective pivot points 87. One of the second heads 89 supports one of the clamping surfaces 86 and another one of the second heads 89 supports another one of the clamping surfaces 86. Therefore, when the second heads 89 rotate, the clamping surfaces 86 correspondingly rotates to accommodate a particular configuration and/or particular orientation of the first part 16. For example, the second heads 89 can each be partially spherical in configuration.

The second clamping device 42 can also include a plurality of second casings 91 that support respective second heads 89. The second casings 91 are configured to allow the second heads 89 to rotate about respective pivot points 87. In certain embodiments, the second casings 91 are at least partially configured to complement the partial spherical configuration of the respective second heads 89. Optionally, the second clamping device 42 can further include a plurality of second bearings or rollers 93 that engage the respective second heads 89 to minimize frictional engagement as the second heads 89 rotate about the respective pivot points 87.

At least one of the clamping surfaces 86 of the second clamping device 42 is movable to selectively clamp the first part 16. In other words, at least one of the clamping surfaces 86 of the second clamping device 42 is movable away from and toward the other one of the clamping surfaces 86 to selectively clamp the first part 16 therebetween. Therefore, the clamping surface(s) 86 of the second clamping device 42 can move away from each other to release the first part 16 or create a space to insert the first part 16 between the clamping surfaces 86. Furthermore, the clamping surface(s) 86 of the second clamping device 42 can move toward each other to secure the first part 16 relative to the second clamping device 42. In certain embodiments, both of the clamping surfaces 86 of the second clamping device 42 are movable toward/away from each other. In other embodiments, one of the clamping surfaces 86 of the second clamping device 42 is movable toward/away from the other one of the clamping surfaces 86 while the other one of the clamping surfaces 86 of the second clamping device 42 is stationary.

Referring to FIG. 4, the second clamping device 42 can include a fourth actuator 90 that selectively moves at least one of the clamping surface(s) 86 of the second clamping device 42 toward or away from the other one of the clamping surfaces 86. The fourth actuator 90 can be rotatable with the second clamping device 42 relative to the frame 32/cross bar 44 or be in any suitable location. Regardless of the location of the fourth actuator 90, when the fourth actuator 90 is actuated, one or both of the clamping surfaces 86 move toward or away from each other. When the fourth actuator 90 is actuated to clamp the first part 16, the force 88 applied to the first part 16 is sufficient to hold the first part 16 between the clamping surfaces 86. The fourth actuator 90 can be a pneumatic actuator, a hydraulic actuator, or any other suitable actuator.

Continuing with FIG. 4, the fourth actuator 90 can be in communication with a fourth controller 92. The fourth controller 92 can control the fourth actuator 90 to selectively move the clamping surface(s) 86 of the second clamping device 42 which selectively secures the first part 16 to the second clamping device 42. Specifically, the fourth controller 92 determines the position that the clamping surface(s) 86 of the second clamping device 42 are to be in relative to each other, and signals the fourth actuator 90 to actuate which moves the clamping surface(s) 86 accordingly. The fourth controller 92 can be part of an electronic control module.

The fourth controller 92 can control other components not specifically discussed herein and/or be in electrical communication with one or more of the first, second and third controllers 48, 62, 80 or another controller. In certain embodiments, the fourth actuator 90 can be in communication with the first controller 48 such that the first controller 48 controls the first, second, third and fourth actuators 46, 58, 78, 90, and therefore, the fourth controller 92 can be eliminated. When utilizing the second controller 62, the fourth actuator 90 can be in communication with the first controller 48 or the second controller 62 such that either the first controller 48 controls the fourth actuator 90 or the second controller 62 controls the fourth actuator 90, and therefore, the fourth controller 92 can be eliminated. Alternatively, when utilizing the third controller 80, the fourth actuator 90 can be in communication with the third controller 80 such that the third controller 80 controls the fourth actuator 90, and therefore, the fourth controller 92 can be eliminated.

The fourth controller 92 can include a processor 94 and a memory 96 on which is recorded instructions for controlling the fourth actuator 90. The fourth controller 92 is configured to execute the instructions from the memory 96, via the processor 94. For example, the fourth controller 92 can be a host machine or distributed system, e.g., a computer such as a digital computer or microcomputer, and/or as a proportional-integral-derivative (PID) controller device having the processor 94, and, as the memory 96, tangible, non-transitory computer-readable memory such as read-only memory (ROM) or flash memory. The fourth controller 92 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the fourth controller 92 can include all software, hardware, memory 96, algorithms, connections, sensors, etc., necessary to control the fourth actuator 90. As such, a control method operative to control the fourth actuator 90 can be embodied as software or firmware associated with the fourth controller 92. It is to be appreciated that the fourth controller 92 can also include any device capable of analyzing data from various sensors, comparing data, making the necessary decisions required to control and monitor the fourth actuator 90.

Figure 7:
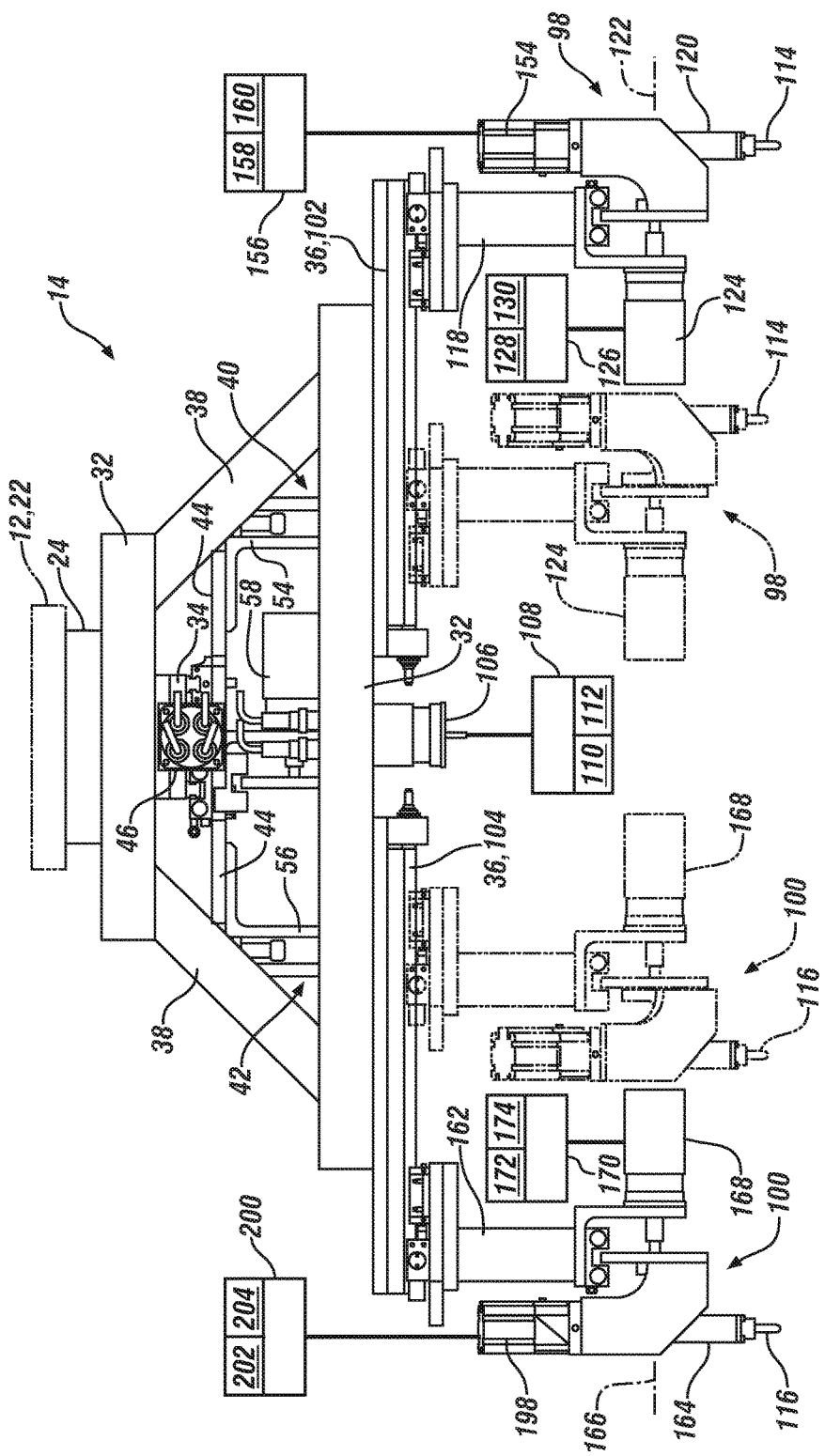
FIG. 7 is a schematic side view of the first pin device illustrated in solid lines in one position along a second track and disposed in one position relative to the pivot point and illustrated in phantom lines in another position along the second track and disposed in another position relative to the pivot point, and also a second pin device illustrated in solid lines in one position along the second track and disposed in one position relative to a pivot point and illustrated in phantom lines in another position along the second track and disposed in another position relative to the pivot point.

Referring to FIGS. 2 and 7, the part holding assembly 14 also includes a first pin device 98 and a second pin device 100 each supported by the frame 32. The first pin device 98 is movable along the second track 36 in a third direction and a fourth direction opposite the third direction for positioning the first pin device 98 relative to the location of one of the holes 26, 28 of the first part 16. The second pin device 100 is also movable along the second track 36 in the third direction and the fourth direction for positioning the second pin device 100 relative to the first part 16. Generally, the first and second directions are different from the third and fourth directions.

For illustrative purposes only, the first and second pin devices 98, 100 are illustrated in one position relative to the frame 32 in phantom lines in FIG. 7, and the first and second pin devices 98, 100 are illustrated in another position relative to the frame 32 in solid lines in FIG. 7. Therefore, the position of the first and second pin devices 98, 100 can be adjusted for different sized first parts 16 and/or different locations of the holes 26, 28. Thus, the part holding assembly 14 is versatile to accommodate for different first parts 16.

In certain embodiments, the first and second pin devices 98, 100 are movable substantially linearly between the different positions in the third and fourth directions, and as discussed above, the first and second clamping devices 40, 42 can be movable substantially linearly between the different positions in the first and second directions. Therefore, in certain embodiments, the first and second directions can be substantially perpendicular to the third and fourth directions.

As discussed above, the first and second pin devices 98, 100 are movable along the second track 36. The first and second pin devices 98, 100 can be movable simultaneously along the second track 36, have partial overlapping movement or move independently of each other along the second track 36, i.e., one moves before the other or one moves while the other remains stationary. Furthermore, in certain embodiments, the first and second pin devices 98, 100 move in opposite directions, i.e., one moves in the third direction and the other moves in the fourth direction. Alternatively, the first and second pin devices 98, 100 can move in the same directions, i.e., both move in the third direction or both move in the fourth direction.

The second track 36 can be one continuous track or as shown in FIG. 7, the second track 36 can be split into a first segment 102 and a second segment 104. The first pin device 98 can move along the first segment 102, and the second pin device 100 can move along the second segment 104. The first and second segments 102, 104 can be spaced from each other and can be disposed substantially parallel to each other. Simply stated, the first and second segments 102, 104 can be substantially parallel to each other and spaced apart from each other. Therefore, the second track 36 can include the first segment 102 having the first pin device 98 movable along the first segment 102 and the second segment 104 spaced from the first segment 102. When utilizing the first and second segments 102, 104, it is to be appreciated that the first and second segments 102, 104 can be any suitable location.

The part holding assembly 14 can include a fifth actuator 106 that selectively moves the first and second pin devices 98, 100 along the second track 36. The fifth actuator 106 can be in communication with a fifth controller 108. The fifth controller 108 can control the fifth actuator 106 to selectively change the position of the first and second pin devices 98, 100 relative to the frame 32. Specifically, the fifth controller 108 determines the position that the first and second pin devices 98, 100 are to be located along the second track 36, and signals the fifth actuator 106 to actuate which moves the first and second pin devices 98, 100 along the second track 36. The fifth controller 108 can be part of an electronic control module. The fifth actuator 106 can be a pneumatic actuator, a hydraulic actuator, or any other suitable actuator.

The fifth controller 108 can control other components not specifically discussed herein and/or be in electrical communication with one or more of the first, second, third and fourth controllers 48, 62, 80, 92 or another controller. In certain embodiments, the fifth actuator 106 can be in communication with the first controller 48 such that the first controller 48 controls the first, second, third, fourth and fifth actuators 46, 58, 78, 90, 106, and therefore, the fifth controller 108 can be eliminated. When utilizing the second controller 62, the fifth actuator 106 can be in communication with the first controller 48 or the second controller 62 such that either the first controller 48 controls the fifth actuator 106 or the second controller 62 controls the fifth actuator 106, and therefore, the fifth controller 108 can be eliminated. When utilizing the third controller 80, the fifth actuator 106 can be in communication with the third controller 80 such that the third controller 80 controls the fifth actuator 106, and therefore, the fifth controller 108 can be eliminated. When utilizing the fourth controller 92, the fifth actuator 106 can be in communication with the fourth controller 92 such that the fourth controller 92 controls the fifth actuator 106, and therefore, the fifth controller 108 can be eliminated.

The fifth controller 108 can include a processor 110 and a memory 112 on which is recorded instructions for controlling the fifth actuator 106. The fifth controller 108 is configured to execute the instructions from the memory 112, via the processor 110. For example, the fifth controller 108 can be a host machine or distributed system, e.g., a computer such as a digital computer or microcomputer, and/or as a proportional-integral-derivative (PID) controller device having the processor 110, and, as the memory 112, tangible, non-transitory computer-readable memory such as read-only memory (ROM) or flash memory. The fifth controller 108 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the fifth controller 108 can include all software, hardware, memory 112, algorithms, connections, sensors, etc., necessary to control the fifth actuator 106. As such, a control method operative to control the fifth actuator 106 can be embodied as software or firmware associated with the fifth controller 108. It is to be appreciated that the fifth controller 108 can also include any device capable of analyzing data from various sensors, comparing data, making the necessary decisions required to control and monitor the fifth actuator 106.

Referring to FIG. 7, the first pin device 98 includes a first pin 114 and the second pin device 100 can include a second pin 116. The first and second pins 114, 116 are utilized to locate the holes 26, 28 respectively. Each of the first and second pins 114, 116 is movable between a closed position (shown in FIGS. 7, 8, 10 and 12) and an open position (shown in FIGS. 9 and 11). The first and second pins 114, 116 are shown schematically in FIGS. 5 and 7 to generally indicate the location of the pins 114, 116 relative to the second track 36. The details of the pins 114, 116 are shown in FIGS. 8-12, which are discussed further below.

The first pin 114 is configured to be disposed through one of the holes 26, 28 of the first part 16 when in the closed position for locating the first part 16. Similarly, the second pin 116 is configured to be disposed through another one of the holes 26, 28 of the first part 16 when in the closed position for locating the first part 16. The first pin 114 is also configured to expand in the one of the holes 26, 28 when in the open position for securing the first part 16 to the first pin device 98. Similarly, the second pin 116 is configured to expand in the another one of the holes 26, 28 when in the open position for securing the first part 16 to the second pin device 100. Therefore, simply stated, the first and second pins 114, 116 are configured to be disposed through respective holes 26, 28 of the first part 16 when in the closed position for locating the first part 16, and each are configured to expand in respective holes 26, 28 to secure the first part 16 to the first and second pin devices 98, 100 respectively.

For example, when in the closed position, the first pin 114 can be disposed through the first hole 26 of the first part 16 and the second pin 116 can be disposed through the second hole 28 of the first part 16. The first and second pins 114, 116 can move between the closed and open position simultaneously with each other, have partial overlapping movement with each other or move independently of each other, i.e., one moves before the other or one moves while the other remains stationary.

The first and second pins 114, 116 are configured to expand in the respective when in the open position for securing the first part 16 to the first and second pin devices 98, 100. Therefore, for example, when in the open position, the first pin 114 can expand in the first hole 26 of the first part 16 and the second pin 116 can expand in the second hole 28 of the first part 16. The first and second pins 114, 116 can be any suitable configuration and FIGS. 8-11 illustrate one suitable configuration of the pins 114, 116, and FIG. 12 illustrates another suitable configuration of the pins 114, 116. Both of the pins 114, 116 can be substantially the same configuration or the pins 114, 116 can be different configurations. Therefore, for example, both of the pins 114, 116 can be in the configuration of FIGS. 8-11 or both of the pins 114, 116 can be in the configuration of FIG. 12. Alternatively, one of the pins 114, 116 can be in the configuration of FIGS. 8-11 and the other one of the pins 114, 116 can be in the configuration of FIG. 12.

Referring to FIGS. 5 and 7, the first pin device 98 can include a first bracket 118 and a first housing 120 supported by the first bracket 118. The first housing 120 supports the first pin 114 and the first housing 120 is rotatable about a pivot point 122 to selectively change a position of the first housing 120 relative to the first bracket 118 which correspondingly changes a position of the first pin 114 relative to the first bracket 118. For illustrative purposes only, the first pin device 98 is illustrated in one rotated position relative to the frame 32 in phantom lines in FIGS. 5 and 7, and the first pin device 98 is illustrated in another rotated position relative to the frame 32 in solid lines in FIGS. 5 and 7. Having the first pin device 98 being rotatable provides versatility of the part holding assembly 14 to accommodate different sized first parts 16 and/or different locations of the holes 26, 28.

The part holding assembly 14 can include a sixth actuator 124 that selectively rotates the first pin device 98 about the pivot point 122. The first pin device 98 can be rotatable relative to the frame 32, and more specifically relative to the first bracket 118. The sixth actuator 124 can be attached to the first housing 120 or be in any suitable location. Regardless of the location of the sixth actuator 124, when the sixth actuator 124 is actuated, the first pin device 98 rotates about the pivot point 122 relative to the first bracket 118. The sixth actuator 124 can be a pneumatic actuator, a hydraulic actuator, or any other suitable actuator.

Continuing with FIG. 7, the sixth actuator 124 can be in communication with a sixth controller 126. The sixth controller 126 can control the sixth actuator 124 to selectively rotate the first pin device 98 relative to the frame 32. Specifically, the sixth controller 126 determines the position that the first pin device 98 is to be rotated to relative to the frame 32, and signals the sixth actuator 124 to actuate which rotates the first pin device 98 and positions the first pin 114 in a particular position. The sixth controller 126 can be part of an electronic control module.

The sixth controller 126 can control other components not specifically discussed herein and/or be in electrical communication with one or more of the first, second, third, fourth and fifth controllers 48, 62, 80, 92, 108 or another controller. In certain embodiments, the sixth actuator 124 can be in communication with the first controller 48 such that the first controller 48 controls the first, second, third, fourth, fifth and sixth actuators 46, 58, 78, 90, 106, 124, and therefore, the sixth controller 126 can be eliminated. When utilizing the second controller 62, the sixth actuator 124 can be in communication with the first controller 48 or the second controller 62 such that either the first controller 48 controls the sixth actuator 124 or the second controller 62 controls the sixth actuator 124, and therefore, the sixth controller 126 can be eliminated. When utilizing the third controller 80, the sixth actuator 124 can be in communication with the third controller 80 such that the third controller 80 controls the sixth actuator 124, and therefore, the sixth controller 126 can be eliminated. When utilizing the fourth controller 92, the sixth actuator 124 can be in communication with the fourth controller 92 such that the fourth controller 92 controls the sixth actuator 124, and therefore, the sixth controller 126 can be eliminated. When utilizing the fifth controller 108, the sixth actuator 124 can be in communication with the fifth controller 108 such that the fifth controller 108 controls the sixth actuator 124, and therefore, the sixth controller 126 can be eliminated.

The sixth controller 126 can include a processor 128 and a memory 130 on which is recorded instructions for controlling the sixth actuator 124. The sixth controller 126 is configured to execute the instructions from the memory 130, via the processor 128. For example, the sixth controller 126 can be a host machine or distributed system, e.g., a computer such as a digital computer or microcomputer, and/or as a proportional-integral-derivative (PID) controller device having the processor 128, and, as the memory 130, tangible, non-transitory computer-readable memory such as read-only memory (ROM) or flash memory. The sixth controller 126 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the sixth controller 126 can include all software, hardware, memory 130, algorithms, connections, sensors, etc., necessary to control the sixth actuator 124. As such, a control method operative to control the sixth actuator 124 can be embodied as software or firmware associated with the sixth controller 126. It is to be appreciated that the sixth controller 126 can also include any device capable of analyzing data from various sensors, comparing data, making the necessary decisions required to control and monitor the sixth actuator 124.

Figure 10:
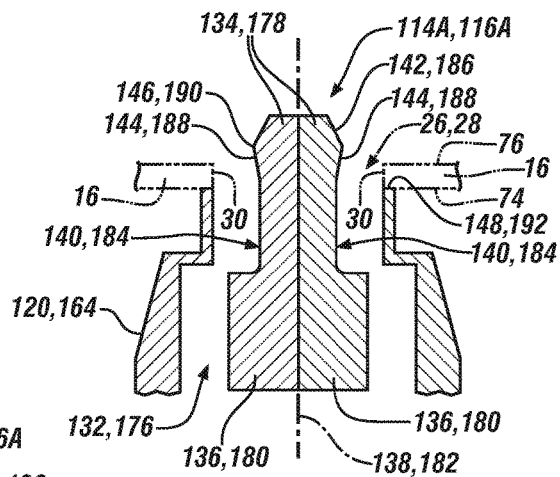
FIG. 10 is a schematic fragmentary cross-sectional view of the pin of FIG. 8 in the closed position, with the part shown in phantom lines.
Figure 11:
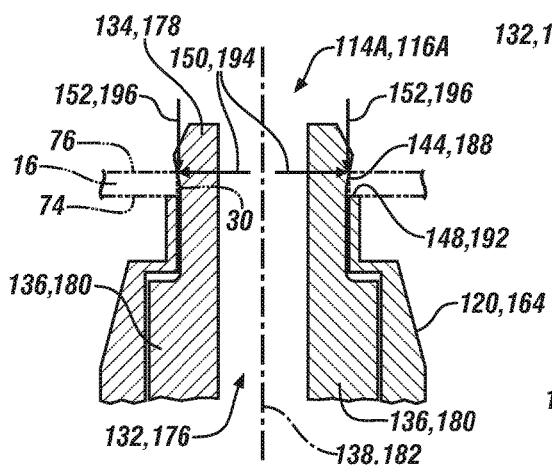
FIG. 11 is a schematic fragmentary cross-sectional view of the pin of FIG. 8 in the open position, with the part shown in phantom lines.
Figure 12:
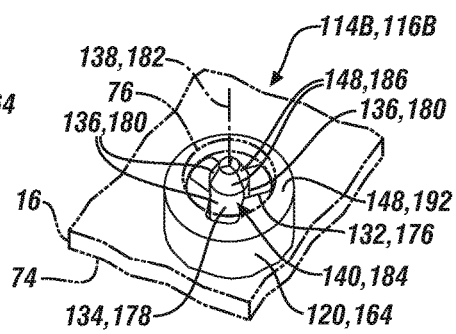
FIG. 12 is a schematic perspective view of a pin of another configuration in the closed position, with the part shown in phantom lines.

The first housing 120 can define a first aperture 132 (best shown in FIGS. 10 and 11). The first pin 114 is disposed in the first aperture 132 and partially extends beyond the first housing 120 such that an end portion 134 of the first pin 114 is exposed outside of the first housing 120. The exposed portion of the first pin 114 can be inserted through the first hole 26 of the first part 16, which is best shown in FIGS. 10 and 11.

The first pin 114 can include a plurality of first fingers 136 (best shown in FIGS. 8-12). More specifically, in certain embodiments, the end portion 134 of the first pin 114 can include the first fingers 136. Generally, movement of the first fingers 136 is controlled. The first fingers 136 are disposed adjacent to each other when in the closed position such that the first fingers 136 are insertable into the one of the holes 26, 28 of the first part 16 to locate the first part 16. Said differently, the first fingers 136 are disposed adjacent to each other when in the closed position such that the first fingers 136 are configured to be inserted into the one of the holes 26, 28 of the first part 16 to locate the first part 16. Optionally, the first fingers 136 can abut each other when in the closed position.

Furthermore, the first fingers 136 are disposed further from each other when in the open position than when in the closed position such that the first fingers 136 are movable away from each other to engage the first part 16 within the one of the holes 26, 28 of the first part 16 which secures the first part 16 to the first pin device 98. Therefore, the first fingers 136 can be spaced from each other when in the open position and can engage the perimeter edge 30 when in the open position.

As best shown in FIGS. 10 and 11, the first aperture 132 is disposed along a first axis 138. The first fingers 136 are movable relative to the first axis 138 between the closed and open positions. Therefore, when the first fingers 136 are in the closed position, the first fingers 136 are disposed adjacent to the first axis 138, and when the first fingers 136 are in the open position, the first fingers 136 move outwardly away from the first axis 138.

Figure 8:
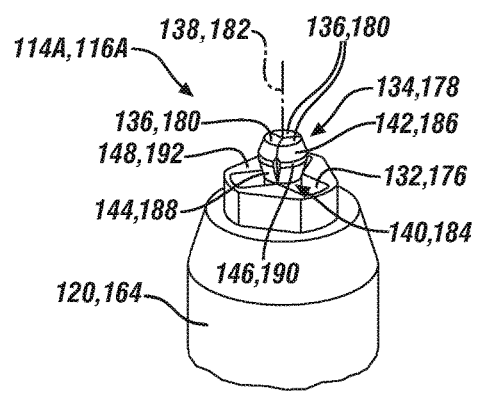
FIG. 8 is a schematic perspective view of a pin in a closed position.
Figure 9:
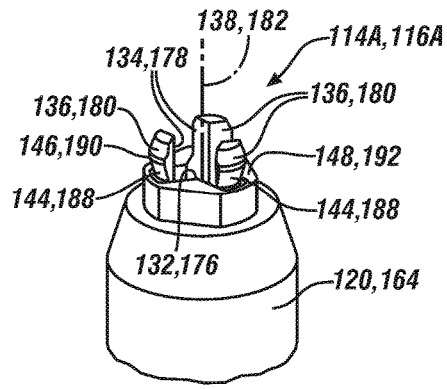
FIG. 9 is a schematic perspective view of the pin of FIG. 8 in an open position.

The first fingers 136 are configured to cooperate with different types of material and different thicknesses of material that the first part 16 can be formed of. The first fingers 136 can have different configurations as best shown in FIGS. 8 and 12. Generally, the first fingers 136 of both embodiments can each include an outer surface 140 facing outwardly away from the first axis 138. The outer surface 140 of each of the first fingers 136 engages the first part 16 within the first hole 26 when in the open position to secure the first part 16 to the first pin device 98. More specifically, the outer surface 140 of the first fingers 136 can engage the perimeter edge 30 of the first part 16.

The outer surface 140 of the first fingers 136 can have different configurations to assist in securing the first part 16 to the first pin device 98. For example, the outer surface 140 of the first fingers 136 can have different tapers. It is to be appreciated that the outer surface 140 of the first fingers 136 can be other configurations than illustrated in the Figures. The configuration of the outer surface 140 of the first fingers 136 assists in securing the first part 16 to the first pin device 98 when the first pin 114 is in the open position. In certain embodiments, the outer surface 140 of each of the first fingers 136 can include a tapered portion 142. Both embodiments of FIGS. 8 and 12 illustrate the tapered portion 142. In certain embodiments, the tapered portion 142 of the first fingers 136 can angle outwardly away from the first axis 138. In one embodiment, the tapered portion 142 of the first fingers 136 can angle outwardly away from the first axis 138 toward the first housing 120. Therefore, the tapered portion 142 can increase in size as the tapered portion 142 angles toward the first housing 120.

The tapered portion 142 discussed immediately above can be referred to as a first tapered portion 142. The outer surface 140 of each of the first fingers 136 for the embodiment of FIG. 8 can further include a second tapered portion 144. In certain embodiments, the second tapered portion 144 of the first fingers 136 can angle outwardly away from the first axis 138. In one embodiment, the second tapered portion 144 of the first fingers 136 can angle outwardly away from the first axis 138 toward the first tapered portion 142. Therefore, the second tapered portion 144 can increase in size as the second tapered portion 144 angles toward the first tapered portion 142. Simply stated, the first and second tapered portions 142, 144 can meet at an apex 146 (as best shown in FIG. 10).

Referring to FIGS. 10-12, the end portion 134 of the first pin 114 can be inserted into the first hole 26 until the first surface 74 of the first part 16 abuts a rest 148 of the first housing 120. Once the first surface 74 rests against the rest 148, the first fingers 136 can be moved to the open position, which causes the outer surface 140 of the first fingers 136 to engage the perimeter edge 30 of the first part 16 in the first hole 26. Therefore, the first fingers 136 apply a first force 150 (identified as arrows 150 in FIG. 11) outwardly to the perimeter edge 30 of the first part 16 in the first hole 26 when in the open position. Generally, the first force 150 can be applied substantially perpendicular to the surface of the perimeter edge 30.

In the embodiment of FIG. 8, the second tapered portion 144 of the first fingers 136 engages the perimeter edge 30 of the first part 16 in the first hole 26 when in the open position. The configuration of the second tapered portion 144 of the first fingers 136 can also apply a second force 152 (identified as arrows 152 in FIG. 11) to the first part 16 when in the open position. Therefore, the first fingers 136 apply the second force 152 to the second surface 76 of the first part 16. As discussed above, the second surface 76 opposes the first surface 74. Generally, the second force 152 can be applied substantially perpendicular to the second surface 76 of the first part 16. As such, the first fingers 136 can clamp the first part 16 between the second tapered portion 144 and the rest 148.

In the embodiment of FIG. 12, the outer surface 140 of the first fingers 136, which is spaced from the first tapered portion 142, engages the perimeter edge 30 of the first part 16 when in the open position. Therefore, in the embodiment of FIG. 12, the first tapered portion 142 of the first fingers 136 does not engage the perimeter edge 30. In the embodiment of FIG. 12, the first force 150 is applied outwardly to the perimeter edge 30 of the first part 16 in the first hole 26 when in the open position, and the first force 150 can be applied substantially perpendicular to the surface of the perimeter edge 30 (the illustration of the arrows 150 of FIG. 11 also applies to the FIG. 12 embodiment). Additionally, the second force 152 is applied to the first part 16, but since this embodiment does not have the second tapered portion 144, the first fingers 136 do not clamp the first part 16, but instead, provide frictional engagement at the perimeter edge 30 to assist in holding the first part 16 to the first pin device 98. In the embodiment of FIG. 12, the second force 152 is applied substantially parallel to and at the perimeter edge 30 of the first hole 26 (the illustration of the arrows 152 of FIG. 11 also applies to the FIG. 12 embodiment).

The first pin device 98 can include a seventh actuator 154 (see FIG. 7) that selectively moves the first fingers 136 between the closed and open positions. The seventh actuator 154 can be in communication with a seventh controller 156. The seventh controller 156 can control the seventh actuator 154 to selectively change the position of the first fingers 136 relative to the first housing 120. Specifically, the seventh controller 156 determines whether the first fingers 136 are to be in the closed position or the open position, and signals the seventh actuator 154 to actuate which moves the first fingers 136. Additionally, the seventh controller 156 can determine the amount of force 150, 152 to apply to the first part 16 in the first hole 26 when the first fingers 136 are in the open position. Therefore, movement of the first fingers 136 is controlled. The seventh controller 156 can be part of an electronic control module. The seventh actuator 154 can be a pneumatic actuator, a hydraulic actuator, or any other suitable actuator.

The seventh controller 156 can control other components not specifically discussed herein and/or be in electrical communication with one or more of the first, second, third, fourth, fifth and sixth controllers 48, 62, 80, 92, 108, 126 or another controller. In certain embodiments, the seventh actuator 154 can be in communication with the first controller 48 such that the first controller 48 controls the first, second, third, fourth, fifth, sixth and seventh actuators 46, 58, 78, 90, 106, 124, 154, and therefore, the seventh controller 156 can be eliminated. When utilizing the second controller 62, the seventh actuator 154 can be in communication with the first controller 48 or the second controller 62 such that either the first controller 48 controls the seventh actuator 154 or the second controller 62 controls the seventh actuator 154, and therefore, the seventh controller 156 can be eliminated. When utilizing the third controller 80, the seventh actuator 154 can be in communication with the third controller 80 such that the third controller 80 controls the seventh actuator 154, and therefore, the seventh controller 156 can be eliminated. When utilizing the fourth controller 92, the seventh actuator 154 can be in communication with the fourth controller 92 such that the fourth controller 92 controls the seventh actuator 154, and therefore, the seventh controller 156 can be eliminated. When utilizing the fifth controller 108, the seventh actuator 154 can be in communication with the fifth controller 108 such that the fifth controller 108 controls the seventh actuator 154, and therefore, the seventh controller 156 can be eliminated. When utilizing the sixth controller 126, the seventh actuator 154 can be in communication with the sixth controller 126 such that the sixth controller 126 controls the seventh actuator 154, and therefore, the seventh controller 156 can be eliminated.

The seventh controller 156 can include a processor 158 and a memory 160 on which is recorded instructions for controlling the seventh actuator 154. The seventh controller 156 is configured to execute the instructions from the memory 160, via the processor 158. For example, the seventh controller 156 can be a host machine or distributed system, e.g., a computer such as a digital computer or microcomputer, and/or as a proportional-integral-derivative (PID) controller device having the processor 158, and, as the memory 160, tangible, non-transitory computer-readable memory such as read-only memory (ROM) or flash memory. The seventh controller 156 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the seventh controller 156 can include all software, hardware, memory 160, algorithms, connections, sensors, etc., necessary to control the seventh actuator 154. As such, a control method operative to control the seventh actuator 154 can be embodied as software or firmware associated with the seventh controller 156. It is to be appreciated that the seventh controller 156 can also include any device capable of analyzing data from various sensors, comparing data, making the necessary decisions required to control and monitor the seventh actuator 154.

Referring to FIG. 7, the second pin device 100 can include a second bracket 162 and a second housing 164 supported by the second bracket 162. The second housing 164 supports the second pin 116 and the second housing 164 is rotatable about a pivot point 166 to selectively change a position of the second housing 164 relative to the second bracket 162 which correspondingly changes a position of the second pin 116 relative to the second bracket 162. For illustrative purposes only, the second pin device 100 is illustrated in one rotated position relative to the frame 32 in phantom lines in FIG. 7 and the second pin device 100 is illustrated in another rotated position relative to the frame 32 in solid lines in FIG. 7. Having the second pin device 100 being rotatable provides versatility of the part holding assembly 14 to accommodate different sized first parts 16 and/or different locations of the holes 26, 28.

The first and second pin devices 98, 100 can be rotatable about respective pivot points 122, 166 simultaneously, have partial overlapping rotational movement relative to each other or rotate independently of each other, i.e., one rotates before the other or one rotates while the other remains stationary. Furthermore, the first and second pin devices 98, 100 can rotate in opposite directions, i.e., one clockwise and the other counter-clockwise, or the same direction, i.e., both clockwise or both counter-clockwise.

The part holding assembly 14 can include an eighth actuator 168 that selectively rotates the second pin device 100 about the pivot point 166. The second pin device 100 can be rotatable relative to the frame 32, and more specifically relative to the second bracket 162. The eighth actuator 168 can be attached to the second housing 164 or be in any suitable location. Regardless of the location of the eighth actuator 168, when the eighth actuator 168 is actuated, the second pin device 100 rotates about the pivot point 166 relative to the second bracket 162. The eighth actuator 168 can be a pneumatic actuator, a hydraulic actuator, or any other suitable actuator.

Continuing with FIG. 7, the eighth actuator 168 can be in communication with an eighth controller 170. The eighth controller 170 can control the eighth actuator 168 to selectively rotate the second pin device 100 relative to the frame 32. Specifically, the eighth controller 170 determines the position that the second pin device 100 is to be rotated to relative to the frame 32, and signals the eighth actuator 168 to actuate which rotates the second pin device 100 and positions the second pin 116 in a particular position. The eighth controller 170 can be part of an electronic control module.

The eighth controller 170 can control other components not specifically discussed herein and/or be in electrical communication with one or more of the first, second, third, fourth, fifth, sixth and seventh controllers 48, 62, 80, 92, 108, 126, 156 or another controller. In certain embodiments, the eighth actuator 168 can be in communication with the first controller 48 such that the first controller 48 controls the first, second, third, fourth, fifth, sixth, seventh and eighth actuators 46, 58, 78, 90, 106, 124, 154, 168, and therefore, the eight controller can be eliminated. When utilizing the second controller 62, the eighth actuator 168 can be in communication with the first controller 48 or the second controller 62 such that either the first controller 48 controls the eighth actuator 168 or the second controller 62 controls the eighth actuator 168, and therefore, the eighth controller 170 can be eliminated. When utilizing the third controller 80, the eighth actuator 168 can be in communication with the third controller 80 such that the third controller 80 controls the eighth actuator 168, and therefore, the eighth controller 170 can be eliminated. When utilizing the fourth controller 92, the eighth actuator 168 can be in communication with the fourth controller 92 such that the fourth controller 92 controls the eighth actuator 168, and therefore, the eighth controller 170 can be eliminated. When utilizing the fifth controller 108, the eighth actuator 168 can be in communication with the fifth controller 108 such that the fifth controller 108 controls the eighth actuator 168, and therefore, the eighth controller 170 can be eliminated. When utilizing the seventh controller 156, the eighth actuator 168 can be in communication with the seventh controller 156 such that the seventh controller 156 controls the eighth actuator 168, and therefore, the eighth controller 170 can be eliminated.

The eighth controller 170 can include a processor 172 and a memory 174 on which is recorded instructions for controlling the eighth actuator 168. The eighth controller 170 is configured to execute the instructions from the memory 174, via the processor 172. For example, the eighth controller 170 can be a host machine or distributed system, e.g., a computer such as a digital computer or microcomputer, and/or as a proportional-integral-derivative (PID) controller device having the processor 172, and, as the memory 174, tangible, non-transitory computer-readable memory such as read-only memory (ROM) or flash memory. The eighth controller 170 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the eighth controller 170 can include all software, hardware, memory 174, algorithms, connections, sensors, etc., necessary to control the eighth actuator 168. As such, a control method operative to control the eighth actuator 168 can be embodied as software or firmware associated with the eighth controller 170. It is to be appreciated that the eighth controller 170 can also include any device capable of analyzing data from various sensors, comparing data, making the necessary decisions required to control and monitor the eighth actuator 168.

The second housing 164 can define a second aperture 176 (best shown in FIGS. 10 and 11). The second pin 116 is disposed in the second aperture 176 and partially extends beyond the second housing 164 such that an end portion 178 of the second pin 116 is exposed outside of the second housing 164. The exposed portion of the second pin 116 can be inserted through the second hole 28 of the first part 16, which is best shown in FIGS. 10 and 11.

The second pin 116 can include a plurality of second fingers 180 (best shown in FIGS. 8-12). More specifically, in certain embodiments, the end portion 178 of the second pin 116 can include the second fingers 180. Generally, movement of the second fingers 180 is controlled. The second fingers 180 are disposed adjacent to each other when in the closed position such that the second fingers 180 are insertable into the another one of the holes 26, 28 of the first part 16 to locate the first part 16. Said differently, the second fingers 180 are disposed adjacent to each other when in the closed position such that the second fingers 180 are configured to be inserted into the another one of the holes 26, 28 of the first part 16 to locate the first part 16. Optionally, the second fingers 180 can abut each other when in the closed position.

Furthermore, the second fingers 180 are disposed further from each other when in the open position than when in the closed position such that the second fingers 180 are movable away from each other to engage the first part 16 within the another one of the holes 26, 28 of the first part 16 which secures the first part 16 to the second pin device 100. Therefore, the second fingers 180 can be spaced from each other when in the open position and can engage the perimeter edge 30 when in the open position.

As best shown in FIGS. 10 and 11, the second aperture 176 is disposed along a second axis 182. The second fingers 180 are movable relative to the second axis 182 between the closed and open positions. Therefore, when the second fingers 180 are in the closed position, the second fingers 180 are disposed adjacent to the second axis 182, and when the second fingers 180 are in the open position, the second fingers 180 move outwardly away from the second axis 182.

The second fingers 180 are configured to cooperate with different types of material and different thicknesses of material that the first part 16 can be formed of. The second fingers 180 can have different configurations as best shown in FIGS. 8 and 12. Generally, the second fingers 180 of both embodiments can each include an outer surface 184 facing outwardly away from the second axis 182. The outer surface 184 of each of the second fingers 180 engages the first part 16 within the second hole 28 when in the open position to secure the first part 16 to the second pin device 100. More specifically, the outer surface 184 of the second fingers 180 can engage the perimeter edge 30 of the first part 16.

The outer surface 184 of the second fingers 180 can have different configurations to assist in securing the first part 16 to the second pin device 100. For example, the outer surface 184 of the second fingers 180 can have different tapers. It is to be appreciated that the outer surface 184 of the second fingers 180 can be other configurations than illustrated in the Figures. The configuration of the outer surface 184 of the second fingers 180 assists in securing the first part 16 to the second pin device 100 when the second pin 116 is in the open position. In certain embodiments, the outer surface 184 of each of the second fingers 180 can include a tapered portion 186. Both embodiments of FIGS. 8 and 12 illustrate the tapered portion 186. In certain embodiments, the tapered portion 186 of the second fingers 180 can angle outwardly away from the second axis 182. In one embodiment, the tapered portion 186 of the second fingers 180 can angle outwardly away from the second axis 182 toward the second housing 164. Therefore, the tapered portion 186 can increase in size as the tapered portion 186 angles toward the second housing 164.

The tapered portion 186 discussed immediately above can be referred to as a first tapered portion 186. The outer surface 184 of each of the second fingers 180 for the embodiment of FIG. 8 can further include a second tapered portion 188. In certain embodiments, the second tapered portion 188 of the second fingers 180 can angle outwardly away from the second axis 182. In one embodiment, the second tapered portion 188 of the second fingers 180 can angle outwardly away from the second axis 182 toward the first tapered portion 186. Therefore, the second tapered portion 188 can increase in size as the second tapered portion 188 angles toward the first tapered portion 186. Simply stated, the first and second tapered portions 186, 188 can meet at an apex 190 (as best shown in FIG. 10).

Referring to FIGS. 10-12, the end portion 178 of the second pin 116 can be inserted into the second hole 28 until the first surface 74 of the first part 16 abuts a rest 192 of the second housing 164. Once the first surface 74 rests against the rest 192, the second fingers 180 can be moved to the open position, which causes the outer surface 184 of the second fingers 180 to engage the perimeter edge 30 of the first part 16 in the second hole 28. Therefore, the second fingers 180 apply a first force 194 (identified as arrows 194 in FIG. 11) outwardly to the perimeter edge 30 of the first part 16 in the second hole 28 when in the open position. Generally, the first force 194 can be applied substantially perpendicular to the surface of the perimeter edge 30.

In the embodiment of FIG. 8, the second tapered portion 188 of the second fingers 180 engages the perimeter edge 30 of the first part 16 in the second hole 28 when in the open position. The configuration of the second tapered portion 188 of the second fingers 180 can also apply a second force 196 (identified as arrows 196 in FIG. 11) to the first part 16 when in the open position. Therefore, the second fingers 180 apply the second force 196 to the second surface 76 of the first part 16. As discussed above, the second surface 76 opposes the first surface 74. Generally, the second force 196 can be applied substantially perpendicular to the second surface 76 of the first part 16. As such, the second fingers 180 can clamp the first part 16 between the second tapered portion 188 and the rest 192.

In the embodiment of FIG. 12, the outer surface 184 of the second fingers 180, which is spaced from the first tapered portion 186, engages the perimeter edge 30 of the first part 16 when in the open position. Therefore, in the embodiment of FIG. 12, the first tapered portion 186 of the second fingers 180 does not engage the perimeter edge 30. In the embodiment of FIG. 12, the first force 194 is applied outwardly to the perimeter edge 30 of the first part 16 in the second hole 28 when in the open position, and the first force 194 can be applied substantially perpendicular to the surface of the perimeter edge 30 (the illustration of the arrows 194 of FIG. 11 also applies to the FIG. 12 embodiment). Additionally, the second force 196 is applied to the first part 16, but since this embodiment does not have the second tapered portion 188, the second fingers 180 do not clamp the first part 16, but instead, provide frictional engagement at the perimeter edge 30 to assist in holding the first part 16 to the second pin device 100. In the embodiment of FIG. 12, the second force 196 is applied substantially parallel to and at the perimeter edge 30 of the second hole 28 (the illustration of the arrows 196 of FIG. 11 also applies to the FIG. 12 embodiment).

The second pin device 100 can include a ninth actuator 198 (see FIG. 7) that selectively moves the second fingers 180 between the closed and open positions. The ninth actuator 198 can be in communication with a ninth controller 200. The ninth controller 200 can control the ninth actuator 198 to selectively change the position of the second fingers 180 relative to the second housing 164. Specifically, the ninth controller 200 determines whether the second fingers 180 are to be in the closed position or the open position, and signals the ninth actuator 198 to actuate which moves the second fingers 180. Additionally, the ninth controller 200 can determine the amount of force 194, 196 to apply to the first part 16 in the second hole 28 when the second fingers 180 are in the open position. Therefore, movement of the second fingers 180 is controlled. The ninth controller 200 can be part of an electronic control module. The ninth actuator 198 can be a pneumatic actuator, a hydraulic actuator, or any other suitable actuator.

The ninth controller 200 can control other components not specifically discussed herein and/or be in electrical communication with one or more of the first, second, third, fourth, fifth, sixth, seventh and eighth controllers 48, 62, 80, 92, 108, 126, 156, 170 or another controller. In certain embodiments, the ninth actuator 198 can be in communication with the first controller 48 such that the first controller 48 controls the first, second, third, fourth, fifth, sixth, seventh, eighth and ninth actuators 46, 58, 78, 90, 106, 124, 154, 168, 198, and therefore, the ninth controller 200 can be eliminated. When utilizing the second controller 62, the ninth actuator 198 can be in communication with the first controller 48 or the second controller 62 such that either the first controller 48 controls the ninth actuator 198 or the second controller 62 controls the ninth actuator 198, and therefore, the ninth controller 200 can be eliminated. When utilizing the third controller 80, the ninth actuator 198 can be in communication with the third controller 80 such that the third controller 80 controls the ninth actuator 198, and therefore, the ninth controller 200 can be eliminated. When utilizing the fourth controller 92, the ninth actuator 198 can be in communication with the fourth controller 92 such that the fourth controller 92 controls the ninth actuator 198, and therefore, the ninth controller 200 can be eliminated. When utilizing the fifth controller 108, the ninth actuator 198 can be in communication with the fifth controller 108 such that the fifth controller 108 controls the ninth actuator 198, and therefore, the ninth controller 200 can be eliminated. When utilizing the sixth controller 126, the ninth actuator 198 can be in communication with the sixth controller 126 such that the sixth controller 126 controls the ninth actuator 198, and therefore, the ninth controller 200 can be eliminated. When utilizing the seventh controller 156, the ninth actuator 198 can be in communication with the seventh controller 156 such that the seventh controller 156 controls the ninth actuator 198, and therefore, the ninth controller 200 can be eliminated. When utilizing the eighth controller 170, the ninth actuator 198 can be in communication with the eighth controller 170 such that the eighth controller 170 controls the ninth actuator 198, and therefore, the ninth controller 200 can be eliminated.

The ninth controller 200 can include a processor 202 and a memory 204 on which is recorded instructions for controlling the ninth actuator 198. The ninth controller 200 is configured to execute the instructions from the memory 204, via the processor 202. For example, the ninth controller 200 can be a host machine or distributed system, e.g., a computer such as a digital computer or microcomputer, and/or as a proportional-integral-derivative (PID) controller device having the processor 202, and, as the memory 204, tangible, non-transitory computer-readable memory such as read-only memory (ROM) or flash memory. The ninth controller 200 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the ninth controller 200 can include all software, hardware, memory 204, algorithms, connections, sensors, etc., necessary to control the ninth actuator 198. As such, a control method operative to control the ninth actuator 198 can be embodied as software or firmware associated with the ninth controller 200. It is to be appreciated that the ninth controller 200 can also include any device capable of analyzing data from various sensors, comparing data, making the necessary decisions required to control and monitor the ninth actuator 198.

The present disclosure also provides a method of locating and securing the first part 16. The method includes positioning the part holding assembly 14 relative to the first part 16. The part holding assembly 14 includes the features discussed above, some of which are the frame 32, the first pin device 98 including the first pin 114 and the first clamping device 40 including the plurality of clamping surfaces 68 facing each other.

The method also includes clamping the first part 16 between the clamping surfaces 68 of the first clamping device 40 to secure the first part 16 to the first clamping device 40. In certain embodiments, the method can include clamping the first part 16 between the clamping surfaces 86 of the second clamping device 42 to secure the first part 16 to the second clamping device 42. The method can also include moving the first and second clamping devices 40, 42 to position the first and second clamping devices 40, 42 relative to the first part 16 to clamp the first part 16 at a desired position.

The method further includes moving the first pin device 98 to position the first pin device 98 relative to the location of the first hole 26 of the first part 16 and inserting the first pin 114 of the first pin device 98 into the first hole 26 of the first part 16 to locate the first part 16. In certain embodiments, the method can also include inserting the second pin 116 into the second hole 28 of the first part 16 to locate the first part 16. In certain embodiments, moving the first and second pin devices 98, 100 occur before inserting the first and second pins 114, 116 into the first and second holes 26, 28 respectively to locate the first part 16.

The method also includes expanding the first pin 114 after inserting the first pin 114 into the first hole 26 to secure the first part 16 to the first pin device 98. In certain embodiments, the method can include expanding the second pin 116 after inserting the second pin 116 into the second hole 28 to secure the first part 16 to the second pin device 100. Expanding the pins 114, 116 can include moving the first fingers 136 outwardly toward the perimeter edge 30 of the first hole 26 and moving the second fingers 180 outwardly toward the perimeter edge 30 of the second hole 28. Once the first and second pins 114, 116 are expanded to secure the first part 16 to the part holding assembly 14 and the first part 16 is secured to the first and second clamping devices 40, 42 by the clamping surfaces 68, 86, the first part 16 can be moved to position the first part 16 relative to the base part 18 or the support structure 12. Then a subsequent operation can occur, such as, welding or fastening the first part 16 to the base part 18, or welding or fastening another part to the first part 16.

The method can include other features not specifically identified in the method discussion. Therefore, the method can include other features disclosed herein.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A part holding assembly configured to locate and secure a part defining a plurality of holes, the assembly comprising:
    a frame including a first track and a second track disposed transverse to the first track;
    a first clamping device movable along the first track in a first direction and a second direction opposite the first direction for positioning the first clamping device relative to the part, and the first clamping device configured to engage the part to secure the part to the first clamping device;
    a first pin device movable along the second track in a third direction and a fourth direction opposite the third direction for positioning the first pin device relative to the location of one of the holes of the part, with the first and second directions being different from the third and fourth directions;
    wherein the first pin device includes a first pin movable between a closed position and an open position, with the first pin configured to be disposed through the one of the holes of the part when in the closed position for locating the part, and the first pin is configured to expand in the one of the holes when in the open position for securing the part to the first pin device; and
    wherein the first pin includes a plurality of first fingers movable toward each other to insert the first fingers into one of the holes and movable away from each other to engage the part within the one of the holes.

2. The assembly as set forth in claim 1 wherein the first pin device includes a first bracket and a first housing supported by the first bracket, with the first housing supporting the first pin and being rotatable about a pivot point to selectively change a position of the first housing relative to the first bracket which correspondingly changes a position of the first pin relative to the first bracket.

3. The assembly as set forth in claim 2 wherein the first fingers are disposed adjacent to each other when in the closed position such that the first fingers are insertable into the one of the holes of the part to locate the part, and the first fingers are disposed further from each other when in the open position than when in the closed position such that the first fingers are movable away from each other to engage the part within the one of the holes of the part which secures the part to the first pin device.

4. The assembly as set forth in claim 1 further including a second pin device movable along the second track in the third direction and the fourth direction for positioning the second pin device relative to the part, with the first and second pin devices movable independently of each other.

5. The assembly as set forth in claim 4 wherein the second pin device includes a second pin movable between a closed position and an open position, with the second pin configured to be disposed through another one of the holes of the part when in the closed position for locating the part, and the second pin is configured to expand in the another one of the holes when in the open position for securing the part to the second pin device.

6. The assembly as set forth in claim 5 wherein the second pin includes a plurality of second fingers disposed adjacent to each other when in the closed position such that the second fingers are insertable into the another one of the holes of the part to locate the part, and the second fingers are disposed further from each other when in the open position than when in the closed position such that the second fingers are movable away from each other to engage the part within the another one of the holes of the part which secures the part to the second pin device.

7. The assembly as set forth in claim 5 wherein the second pin device includes a second bracket and a second housing supported by the second bracket, with the second housing supporting the second pin and being rotatable about a pivot point to selectively change a position of the second housing relative to the second bracket which correspondingly changes a position of the second pin relative to the second bracket.

8. The assembly as set forth in claim 4 wherein the second track includes a first segment having the first pin device movable along the first segment and a second segment spaced from the first segment, with the second pin device movable along the second segment.

9. The assembly as set forth in claim 8 wherein the first and second segments are substantially parallel and spaced from each other.

10. The assembly as set forth in claim 1 further including a second clamping device spaced from the first clamping device and movable in the first and second directions, and the second clamping device configured to engage the part to secure the part to the second clamping device.

11. The assembly as set forth in claim 10 further including a cross bar movable along the first track in the first and second directions, and the cross bar supports and spaces apart the first and second clamping devices.

12. The assembly as set forth in claim 11 wherein the cross bar includes a first flange having the first clamping device rotatably attached to the first flange for adjusting a position of the first clamping device relative to the part, and wherein the cross bar includes a second flange having the second clamping device rotatably attached to the second flange for adjusting a position of the second clamping device relative to the part.

13. The assembly as set forth in claim 1 wherein the frame includes a connector between the first and second tracks which positions the first and second tracks offset from each other.

14. An assembly system configured to locate and secure a part defining a plurality of holes, the system comprising:
   a support structure including an attachment member;
   a part holding assembly coupled to the attachment member, the assembly including:
      a frame including a first track and a second track disposed transverse to the first track;
      a first clamping device movable along the first track in a first direction and a second direction opposite the first direction for positioning the first clamping device relative to the part, and the first clamping device configured to engage the part to secure the part to the first clamping device;
      a first pin device movable along the second track in a third direction and a fourth direction opposite the third direction for positioning the first pin device relative to the location of one of the holes of the part, with the first and second directions being different from the third and fourth directions;
   wherein the first pin device includes a first pin movable between a closed position and an open position, with the first pin configured to be disposed through the one of the holes of the part when in the closed position for locating the part, and the first pin is configured to expand in the one of the holes when in the open position for securing the part to the first pin device;
   a second pin device movable along the second track in the third direction and the fourth direction for positioning the second pin device relative to the part, with the first and second pin devices movable independently of each other; and
   wherein the second pin device includes a second pin movable between a closed position and an open position, with the second pin configured to be disposed through another one of the holes of the part when in the closed position for locating the part, and the second pin is configured to expand in the another one of the holes when in the open position for securing the part to the second pin device.

15. The system as set forth in claim 14 wherein the first pin device includes a first bracket and a first housing supported by the first bracket, with the first housing supporting the first pin and being rotatable about a pivot point to selectively change a position of the first housing relative to the first bracket which correspondingly changes a position of the first pin relative to the first bracket.

16. The system as set forth in claim 14 wherein the second pin device includes a second bracket and a second housing supported by the second bracket, with the second housing supporting the second pin and being rotatable about a pivot point to selectively change a position of the second housing relative to the second bracket which correspondingly changes a position of the second pin relative to the second bracket.

17. The system as set forth in claim 14 wherein the second track includes a first segment having the first pin device movable along the first segment and a second segment spaced from the first segment, with the second pin device movable along the second segment.

18. The system as set forth in claim 14 further including a second clamping device spaced from the first clamping device and movable in the first and second directions, and the second clamping device configured to engage the part to secure the part to the second clamping device, and further including a cross bar movable along the first track in the first and second directions, and the cross bar supports and spaces apart the first and second clamping devices.

19. A method of locating and securing a part, the method comprising:
   positioning a part holding assembly relative to the first part, with the part holding assembly including a frame, a first pin device including a first pin and a first clamping device including a plurality of clamping surfaces facing each other;
   moving the first pin device to position the first pin device relative to the location of a first hole of the part;
   inserting the first pin of the first pin device into the first hole of the part to locate the part;
   clamping the part between the clamping surfaces of the first clamping device to secure the part to the first clamping device;
   expanding the first pin after inserting the first pin into the first hole to secure the part to the first pin device;
   wherein the first pin includes a plurality of first fingers;
   wherein inserting the first pin of the first pin device into the first hole includes inserting the first fingers into the first hole; and
   moving the first fingers away from each other to engage the part within the first hole.

* * * * *